(12) United States Patent
Andresen et al.

(10) Patent No.: US 11,223,059 B2
(45) Date of Patent: Jan. 11, 2022

(54) METHOD AND POWER PLANT COMPRISING A SOLID OXIDE FUEL CELL (SOFC) FOR PRODUCTION OF ELECTRICAL ENERGY AND $H_2$ GAS

(71) Applicant: ZEG Power AS, Kjeller (NO)

(72) Inventors: Björg Andresen, Oslo (NO); Arne Raaheim, Maura (NO); Julien Meyer, Oslo (NO); Nicola Di Giulio, Oslo (NO); Öystein Ulleberg, Oslo (NO)

(73) Assignee: ZEG POWER AS, Kjeller (NO)

( * ) Notice: Subject to any disclaimer, the term of this patent is extended or adjusted under 35 U.S.C. 154(b) by 89 days.

(21) Appl. No.: 16/317,583

(22) PCT Filed: Jul. 7, 2017

(86) PCT No.: PCT/NO2017/050186
§ 371 (c)(1),
(2) Date: Jan. 14, 2019

(87) PCT Pub. No.: WO2018/012984
PCT Pub. Date: Jan. 18, 2018

(65) Prior Publication Data
US 2019/0267649 A1    Aug. 29, 2019

(30) Foreign Application Priority Data

Jul. 14, 2016    (NO) .................................. 20161175

(51) Int. Cl.
*H01M 8/0668*     (2016.01)
*H01M 8/04701*    (2016.01)
(Continued)

(52) U.S. Cl.
CPC ..... *H01M 8/0668* (2013.01); *H01M 8/04022* (2013.01); *H01M 8/04373* (2013.01);
(Continued)

(58) Field of Classification Search
None
See application file for complete search history.

(56) References Cited

U.S. PATENT DOCUMENTS 6,007,699 A    12/1999    Cole
6,790,430 B1 *  9/2004    Lackner ............... H01M 8/0662
                                                    423/648.1
(Continued)

FOREIGN PATENT DOCUMENTS

JP    2000273472 A    10/2000
WO       0142132 A1     6/2001
(Continued)

OTHER PUBLICATIONS

International Search Report and Written Opinion dated Aug. 11, 2017 for International Patent Application No. PCT/NO2017/050186.
(Continued)

*Primary Examiner* — Robert S Carrico
(74) *Attorney, Agent, or Firm* — Cantor Colburn LLP

(57) ABSTRACT

Method and power plant comprising a Solid Oxide Fuel Cell (SOFC) for production of electrical energy and $H_2$ gas. The power plant is charged with a feed gas selected from the group consisting of natural gas, bio-gas and syngas. The feed gas, prior to being fed to the SOFC, is reformed in a reformer with a CaO containing $CO_2$ absorber, thereby producing a carbon free $H_2$ gas as feed for the SOFC while converting CaO to $CaCO_3$. The latter is regenerated to CaO in an endothermic reaction in a CaO regenerator at a temperature of at least 850° C. utilizing heat from the SOFC to heat the regenerator. A heat exchange medium collects heat in the SOFC and is subjected to further temperature increase in a heating device before being subjected to heat exchange in the CaO regenerator.

20 Claims, 2 Drawing Sheets

(51) Int. Cl.
*H01M 8/0612* (2016.01)
*H01M 8/04014* (2016.01)
*H01M 8/0432* (2016.01)
*H01M 8/124* (2016.01)

(52) U.S. Cl.
CPC ..... *H01M 8/04738* (2013.01); *H01M 8/0618* (2013.01); *H01M 2008/1293* (2013.01); *Y02E 60/50* (2013.01)

(56) References Cited

U.S. PATENT DOCUMENTS

| | | |
|---|---|---|
| 8,778,545 B2 | 7/2014 | Lehar et al. |
| 2004/0065013 A1 | 4/2004 | DeVries |
| 2005/0229489 A1 | 10/2005 | Bavarian et al. |
| 2006/0127714 A1* | 6/2006 | Vik ..................... H01M 8/0662 429/411 |
| 2006/0172176 A1* | 8/2006 | MacBain .......... H01M 8/04097 429/415 |
| 2007/0092765 A1* | 4/2007 | Kong ....................... C01B 3/384 48/197 R |
| 2007/0298478 A1 | 12/2007 | Offerman et al. |
| 2008/0057360 A1* | 3/2008 | Kaye ................. H01M 8/04014 429/423 |
| 2009/0263316 A1 | 10/2009 | Iyer et al. |
| 2010/0301273 A1 | 12/2010 | Blasiak et al. |
| 2012/0171588 A1* | 7/2012 | Fan ..................... H01M 8/0643 429/418 |
| 2013/0011326 A1 | 1/2013 | Grover |
| 2013/0017460 A1 | 1/2013 | Keefer et al. |
| 2014/0342426 A1 | 11/2014 | Angelidaki et al. |
| 2015/0284247 A1 | 10/2015 | Lee et al. |

FOREIGN PATENT DOCUMENTS

| | | |
|---|---|---|
| WO | 2011078681 A1 | 6/2011 |
| WO | 2014200357 A1 | 12/2014 |

OTHER PUBLICATIONS

Japan Office Action for Japan Application No. 2019-524015; dated Apr. 20, 2021, with English Translation, 7 pages.
China Office Action and Search Report for China Application No. 201780055795.8; Application Filing Date: Jul. 7, 2017; Date of Search: Jul. 1, 2021; 19 pages, with English Translation.

* cited by examiner

METHOD AND POWER PLANT COMPRISING A SOLID OXIDE FUEL CELL (SOFC) FOR PRODUCTION OF ELECTRICAL ENERGY AND $H_2$ GAS

BACKGROUND

The present disclosure relates to a method for production of $H_2$ gas and electrical energy in a power plant comprising a Solid Oxide Fuel Cell (SOFC). According to another aspect, the present disclosure relates to a power plant comprising a Solid Oxide Fuel Cell (SOFC) for production of $H_2$ gas and electrical energy.

Hydrogen production by sorption enhanced steam methane reforming (SE-SMR), see reaction a), or sorption enhanced water gas shift (SE-WGS), see reaction b) are known processes, see WO 2011/078681 A1:

a) From natural gas, SE-SMR;
$CaO+CH_4+2H_2O=CaCO_3+4H_2$ (T=500° C. to 650° C.)
b) From syngas (gas with variable amounts of $H_2$+CO), SE-WGS;
$CaO+CO+H_2+H_2O=CaCO_3+2H_2$ (T=500° C. to 650° C.)

Energy efficient CaO absorbent regeneration, ($CaCO_3=CaO+CO_2$ (T at about 900° C.)) is very important in this connection.

Heat or waste heat from SOFC has been suggested for regeneration of the absorbent in the Ca-looping process by many previous experts in the field (for example: Lackner et. Al., 2001; WO 01/42132 A1 and WO 2011/078681 A1), where the heat transfer from the SOFC system to a Ca-looping regenerator, would be sufficient for the regeneration process, if SOFC with stack temperatures above 900° C. are used, which can be achieved by use of ceramic interconnects (Lasosipojana, et al.: 2009)

One critical parameter for design of a SOFC stack is lifetime and cost of materials; ceramics, rear earth materials and/or metals. Today the suppliers mostly focus on SOFC stacks at lower temperatures, in the range of 650-800° C. or in the range of 800-850° C.

The lower SOFC stack temperatures mentioned above, limit in practical terms the SOFC running temperature to about 830° C. (Megel et al. 2013), and the heat of the SOFC exhaust air (consisting of nitrogen and oxygen, when $H_2$ gas is used as fuel) to the same temperature level. The exhaust SOFC air temperature is thus not high enough for the CaO absorbent regeneration mentioned above, unless the CaO regeneration system is run at lower pressure than 1 Atm. A cost and energy efficient method to increase the temperature of the SOFC exhaust air is therefore needed to reach the temperature level necessary (900° C., or above) for the CaO absorbent regeneration process if the SOFC systems is run at a temperature level of 800-850° C.

Furthermore, depending of the fuel type used, to feed the reformer it is also important to be able to vary the amount of high temperature heat supplied to the regenerator. The fuel types used may be: natural gas/methane, syngas (made from any carbon containing solids of fossil or biogenic origin), bio gas from organic waste (with about, 65% $CH_4$ and 35% $CO_2$) or landfill gas (with about, 50% $CH_4$ and 50% $CO_2$).

If raw biogas or landfill gas, after removal of Sulphur components are used directly, with considerable amounts of $CO_2$ (more than 15%, no prior capture of $CO_2$ before introduction to the Reformer), a Ca-looping system with higher (and flexible) capacity compared to fuels with no or little initial $CO_2$ (fossil or biogenic) would be a demand. This in turn, would result in the need for an exhaust heating device (see Figures) capable of supplying variable amounts of high temperature heat.

In addition, the amount of available biogas and/or landfill gas may vary, simply because of varying production rates. Thus, in order to be able to supply the SOFC system with constant flow of fuel, it would be desirable to be able to switch between two Reformer/Regenerator systems;

a) One dedicated for fuel with no/or little additional $CO_2$ and
b) A larger system dedicated for fuel with considerable amount of initial $CO_2$, for example biogas or landfill gas ($CaO+CH_4+2H_2O+CO_2=CaCO_3+4H_2$ (T=500° C. to 650° C.), eq. not balanced) The $CO_2$ would in this case be derived from two sources, one from the original raw biogas/landfill gas and another from the reforming reaction.

This option would also demand a need for an exhaust heating device (see Figures) capable of supplying variable amounts of high temperature heat.

To be able to keep a constant fuel (mainly $H_2$) flow rate to the SOFC system a storage tank for the reformed fuel (mainly $H_2$) may also be needed.

An increase of the exhaust air temperature (830° C.) to a level high enough for CaO absorbent regeneration by adding/supplying fuel to an exhaust heating device capable of supplying variable amounts (based on variable amounts of $CO_2$ in the initial raw biogas) of high temperature heat, have previously not been addressed.

SUMMARY OF THE INVENTION

Provided herein is a method that allows a cost and energy efficient operation of an SOFC based power plant using gas reforming with CaO for $CO_2$ capture, and an SOFC exhaust heating device.

Preferably, the above is provided with no $CO_2$ climate effect and that allows the primary fuel (fuel to the Reformer) to be of any origin (bio- or fossil related; solid, liquid or gas).

It is also an object to be able to handle fuel gases to the Reformer of different compositions, hereunder different initial $CO_2$ content.

It is also a derived object to arrange the total hydrogen (and electricity) production system in a flexible manner, making it easy to switch between Reformer fuel with little or no $CO_2$ (for ex. $CH_4$) and Reformer fuel with considerable amounts of initial $CO_2$ (for ex. biogas (65% $CH_4$ and 35% $CO_2$) made from organic household waste), As will be seen by a person skilled in the art, the present method maintains the beneficial features of WO 2011/078681 A1 (mentioned above) and WO 2004/025767 (Vik et. al.). Sustainability is still a keyword and a common denominator for the overall process. Thus, the process allows total $CO_2$ capture, or climate neutral $CO_2$ handling.

Technically the heat transfer between the SOFC system and the Regenerator, via the exhaust heating device, can be performed in two different manners, 1) Heat integration with SOFC cathodic exhaust heating device
2) Heat integration with heat loop and exhaust heating device.

The heat transfer medium, can in this case be different gases, such as for example; hydrogen, $CO_2$, air, helium, water vapor, different gas mixtures or fluids such as mineral oils, hydrocarbons and different types of molten salts.

The fuel for this heating process can be derived from biological, or from fossil sources.

It is thus possible to use any (hydro)carbon containing fuel (bio- or fossil related; solid, liquid or gas) to enhance the temperature of the SOFC exhaust air in a heating device to provide the temperature and the amount of heat necessary for regeneration of the varying amounts of the CaO—$CO_2$ absorbent.

If the $CO_2$ (100%) from the Regenerator is stored or used and some of the hydrogen from the SOFC system (see Figures) is used as fuel in the heating device (see Figures), the total system for hydrogen and electricity production would for all embodiments not have any climatic consequences.

It is also possible to obtain this (no climate consequence), if other types of fuels (carbon containing, hydrocarbons, fossil or biogenic) are used both in the Regenerator and in the temperature heating device, as can be seen from the different embodiments given below.

BRIEF DESCRIPTION OF THE DRAWINGS

Different embodiments of the invention are illustrated below with reference to the enclosed drawings, where.

DETAILED DESCRIPTION

Figure 1:
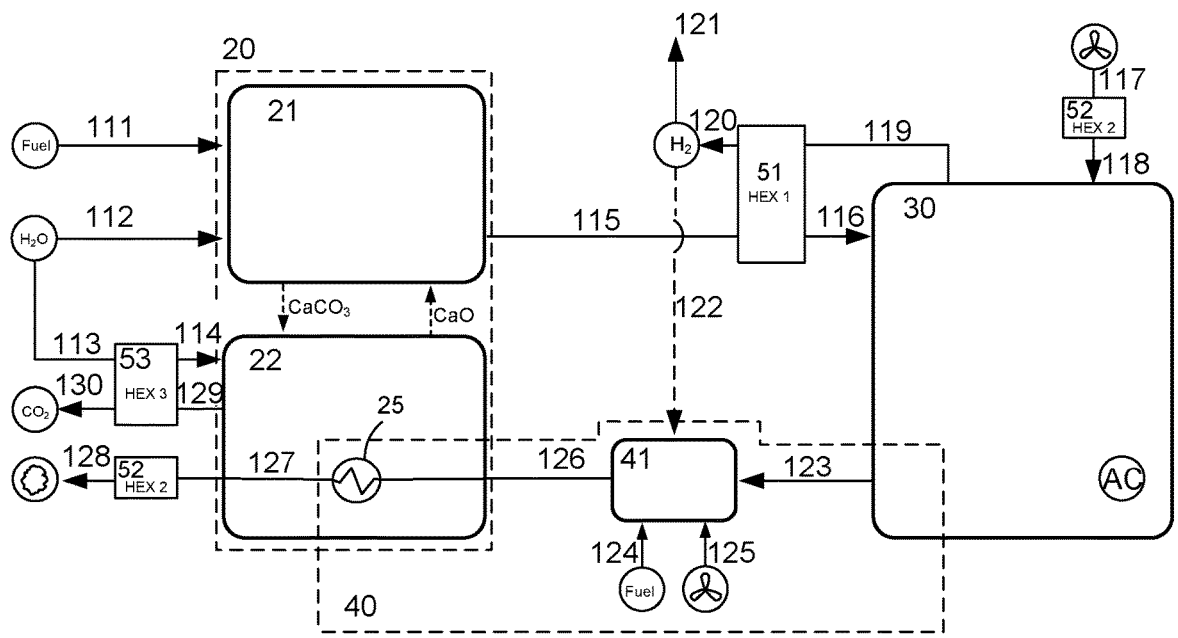
FIG. 1 is a schematic view of a disclosed first embodiment.

Attention is drawn to FIG. 1, showing a hydrogen production plant where an SOFC system is combined with a fuel reformer, a CaO $CO_2$-absorbent regenerator and an exhaust heating system 40 for enhancement of the temperature.

A fuel flow 111 is charged to a Reformer unit 21 being part of a Ca-looping system 20, arranged to reform the fuel and to take care of initial $CO_2$ (if needed) and $CO_2$ released in the reforming process. The fuel is typically natural gas, other methane-rich gas, such as gas produced in fermentation units or syngas. A substantially pure hydrogen gas 115 leaves the reformer unit 21. In the reformer unit 21, the process of reforming involves a reaction between the fuel, water (steam) and CaO in which the latter is converted to $CaCO_3$ in an exothermic reaction. The $CaCO_3$ made both from the initial $CO_2$ (if present) and from the reforming process is subsequently regenerated to CaO in an endothermic process to be described. Water 112 in vaporized form is also charged to the reformer unit 21.

The substantially pure hydrogen gas 115 leaving the reformer unit 21 is heated in a first heat exchanger 51 before being charged to a solid oxide fuel cell (SOFC) 30, as a heated hydrogen flow 116. The SOFC produces electricity and releasing varying amounts of hydrogen 119. Air 118 is also charged to the SOFC, typically after having been heated in a second heat exchanger 52.

The exhaust gas 123 from the SOFC 30 is substantially pure air due to the fact that the fuel 116 charged to the fuel cell is substantially pure hydrogen. The temperature of the exhaust gas from the SOFC 30 is typically about 830° C. and may be somewhat less.

As indicated above, the $CaCO_3$ generated in the reformer unit 21 needs to be regenerated to CaO for reuse as capturing agent in the reformer. This takes place in a regenerator 22 forming a second part of the Ca-looping system 20. However, the regeneration of $CaCO_3$ needs a temperature of at least 850° C., more preferably at least 900° C. to operate efficiently and it is an endothermic process consuming energy. The regenerator 22 also needs some water 114 for its operation, said water typically being preheated in a third heat exchanger 53 in order not to act as a coolant.

The exhaust gas 123 from the SOFC is a promising candidate for maintaining the temperature of the regenerator 22, but its temperature is typically not high enough to perform the task on its own. In practice, the temperature of the exhaust gas 123 is too low to effectively maintain a sufficient temperature in the regenerator 22 at which the $CaCO_3$ is converted to CaO for further use. The core of the disclosed embodiments is the use of a dedicated system, integrated with a fuel reformer, a CaO $CO_2$-absorbent regenerator, and an exhaust temperature increasing system 40 arranged to elevate the temperature of the exhaust gas 123 to allow it to be used for the purpose of maintaining an effective temperature in the regenerator 22 by using a heating device 41 for enhancement of the temperature.

FIG. 1 gives a schematic view of a hydrogen production plant, in which an SOFC system 30, is combined with a fuel reformer 21, a CaO $CO_2$-absorbent regenerator 22 and an exhaust heating device 41, which is fueled for enhancement of the temperature. In this embodiment the fuel charged to the exhaust heating device 41 is burned in air 125.

If all the fuel to both the Reformer 21, and the exhaust heating device 41 is of biogenic origin the total system would be climate neutral. Furthermore, if the fuel, for the heating system through 124, is derived from biological sources, these can typically be:

a) Hydrogen from the SOFC system 122
  b) Landfill gas (with bio-$CO_2$).
  c) Produced biogas, with or without $CO_2$ separation.
  d) Syngas from any bio-source (solid, liquid or gas)
  e) Solid carbon-containing source The $CO_2$ related to/released from these processes would be climate neutral and can after the heat transfer 25 to the Regenerator 22 be released to air as flow 128 without undesired climate consequences. Hydrogen, the most preferred fuel for the exhaust heating device, can be delivered from the downstream side of the reformer 21 through 115, or more preferred as flow 122 which constitutes part of the hydrogen discharge flow 119 from the SOFC, after having had its temperature reduced in a heat exchanger, such as first heat exchanger 51, used to heat the inlet flow 115 of hydrogen to the SOFC 30.

It is, however, also possible to obtain a situation with no climate consequences if the fuel 111 charged to the Reformer 21 is of fossil origin and the fuel to the exhaust heating device 41 is of biogenic origin (see above). This is because the $CO_2$ from the reforming process in the Reformer 21 is efficiently absorbed by the CaO absorbent, cf. reaction a) (SE-SMR) and reaction b) (SE-WGS), and can thus easily be collected 100% pure from the Regenerator 22 for storage or use as flows 129, 130.

Figure 2:
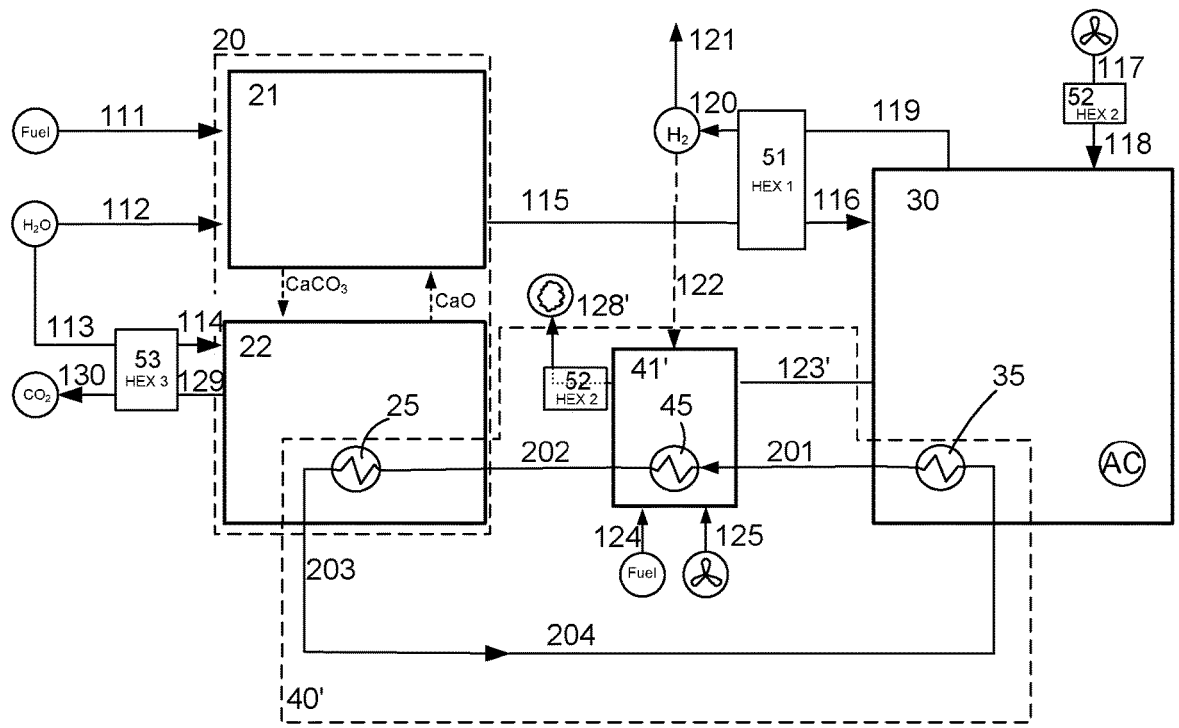
FIG. 2 is a schematic view of a second disclosed embodiment.

Attention is now directed to FIG. 2, showing a hydrogen production plant where an SOFC system is integrated with a fuel reformer, a CaO $CO_2$-absorbent regenerator and to an exhaust heating device for enhancement of the temperature. In this embodiment the heat integration is provided with a closed heat loop 40'.

Most of the components of FIG. 2 are the same as the ones in FIG. 1. The difference between FIG. 1 and FIG. 2 is mainly that the heat transfer between the SOFC 30 and the Regenerator 22, via the exhaust heating device 41', is provided by a closed heat loop 201, 202, 203, 204.

If all the fuel to both the Reformer and the exhaust heating device, in the embodiment illustrated in FIG. 2 is of biogenic origin the total system would also be climate neutral. Similar to the embodiment given in FIG. 1 it is in this case also possible to obtain a situation with no climate consequences if the fuel to the Reformer is of fossil origin and the fuel to the exhaust heating device is of biogenic origin (see above).

If the fuel to the temperature heating device 41' is derived from fossil sources, these can typically be:
a) Hydrogen from the SOFC system
b) Natural gas
c) Gasified solid (coal), liquid or gas hydrocarbons (syngas).
d) Coal This would for the carbon containing fuel require a separate $CO_2$ collection system at 128', to obtain a climate neutral situation.

The heat transfers medium of the heat loop 201-204 in FIG. 2, can be different gases, such as for example; Hydrogen, $CO_2$, air, helium, water vapor, different gas mixtures or fluids such as; mineral oils, hydrocarbons and different types of molten salts. The heat of the heat medium 201 leaving the SOFC system 30, is about 830° C. The heat of this heat loop is enhanced in the temperature heating device 41' to at least 850° C., more preferable at least 950° C. and most preferred at least 1000° C., in order to meet the temperature regeneration requirement of the CaO absorbent in regenerator 22.

The heated exhaust flow 123' from the SOFC system 30 provides the oxygen for the heating process in 41'. The oxygen to the heating device may if needed also be provided by air inlet 125. The exhaust from 41' is heat exchanged in second heat exchanger 52 to heat the air at flow 117 through 118 into the SOFC 30, before leaving the system as flow 128' for release to atmosphere. If the fuel for the heating device is mainly or solely hydrogen, there will be little or no $CO_2$ in the exhaust gas at 128'. If the heating device 41' is fed wholly or partially by a different fuel, though a fuel of organic, non-fossil, origin, the exhaust gas at 128' will be climate-neutral.

The regeneration of the absorbent also releases substantial amounts of pure $CO_2$ shown as flow 129, which needs to be taken care of (used or stored) preferably after having been used for heat exchange in a third heat exchanger 53.

As shown in FIGS. 1 and 2, water (vapor) 112 is added to the reformer unit 21 in order to furnish the reaction zone with required amounts of oxygen and hydrogen.

The principle illustrated by FIGS. 1 and 2 is generally that heat produced by the SOFC 30 is used to regenerate the absorber used to absorb $CO_2$ in the process of reforming the feed gas, but since the temperature of the exhaust gas from the SOFC is typically a little too low to be used alone, its energy and temperature is increased in a subtle and efficient manner. Most elegant is perhaps the present process when hydrogen already being part of the system, is used for boosting the energy, then without the formation of any additional $CO_2$.

Figure 3:
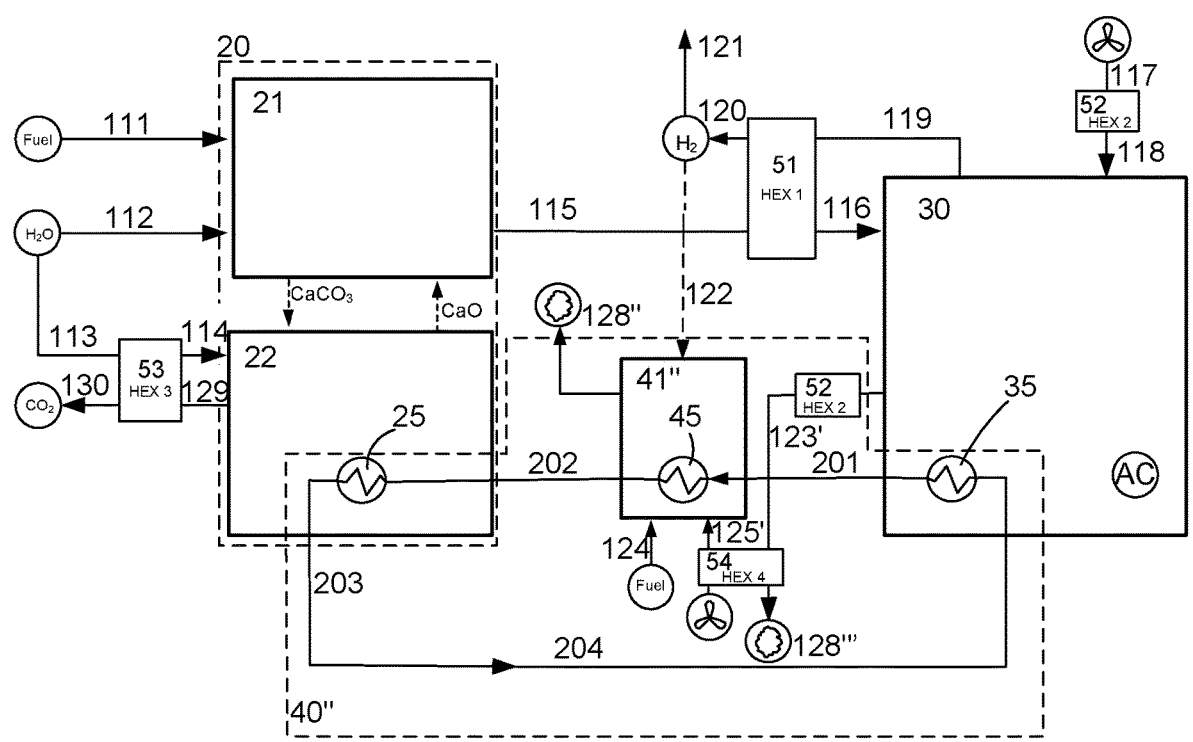
FIG. 3 is a schematic view of a third disclosed embodiment.

Attention is now directed to FIG. 3 showing a hydrogen production plant where an SOFC system is combined with a fuel reformer, a CaO $CO_2$-absorbent regenerator and an exhaust heating device for enhancement of the temperature. In this embodiment the heat transfer is provided with a closed heat loop. The fuel (if carbon containing) to the exhaust heating device is burned in pure oxygen provided by an oxygen pump.

Most of the components of FIG. 3 are the same as the ones in FIGS. 1 and 2. FIG. 3 shows an embodiment where the fuel to the Reformer 22, as well as to the exhaust heating device 41", can be of fossil origin ($CH_4$, natural gas syngas etc.), where it is possible to capture all $CO_2$ from the total production system, for storage or use. The fuel to the heating device, would then have to be burned in pure oxygen supplied as flow 125', by an oxygen pump. The oxygen 125' is typically preheated in a fourth heat exchanger 54, with SOFC exhaust air 123' from second heat exchanger 52. (It is to be noted that the heat exchanger 52 shown to heat flow 117 in FIGS. 1, 2, and 3 is the same heat exchanger as used to cool flow 127 (FIG. 1), flow 128' (FIG. 2) and flow 123' (FIG. 3)).

It is worth noticing, though, that all heat exchange in the present disclosure which is not directly related to the enhancement of the temperature of the heat exchange medium to the CaO regenerator is optional and may be conducted in a number of different ways.

While the inventive concepts disclosed herein may have the form of a number of different embodiments, the heat exchange medium the SOFC 30 typically comprises at least one of exhaust gas 123 and a dedicated heat exchange medium 201, the latter in case circulating in a closed loop between the SOFC, the heating device 41, 41', 41" and the CaO regenerator 22.

The heating device 41 is in one preferred embodiment a burner charged with substantially pure hydrogen gas 122 in an amount sufficient to increase the temperature of the exhaust gas 123 from the SOFC 30 by at least 50° C.

At least a part of the fuel gas charged to the heating device 41 is typically hydrogen gas deviated from the reformer 21.

In one preferred embodiment, at least part of the fuel gas charged to the heating device 41 is hydrogen gas deviated from the hydrogen discharge 119 of the SOFC 30.

LIST OF REFERENCES

20 Ca-looping system
21 Reformer of Ca-looping system 20
22 Regenerator of Ca-looping system 20
25 heat exchanger in regenerator 22
30 SOFC
35 heat exchanger in SOFC 30
40 heat enhancement system (first version)
40' heat enhancement system ($2^{nd}$ version)
40" heat enhancement system ($3^{rd}$ version)
41 heating device (first version)
41' heating device (second version)
41" heating device (third version)
45 heat exchanger in heating device 41' and 41"
51 First heat exchanger
52 Second heat exchanger
53 Third heat exchanger
54 Fourth heat exchanger
111 Feed flow to 21
112 Water to reformer
113 water to (third) heat exchanger
114 water to regenerator
115 hydrogen from reformer
116 hydrogen from heat exchanger to SOFC 30
117 Air to heat exchanger (and later to SOFC)
118 Air from heat exchanger 52 to SOFC 30
119 hydrogen from SOFC to heat exchanger 51
120 hydrogen from heat exchanger 51
121 hydrogen substream for delivery, partial flow of 120
122 hydrogen substream for fuel to heating device 41
123 exhaust flow from SOFC
123' exhaust flow from SOFC (alternative FIG. 2)
123"

124 ext. fuel to heating device 41
125 air flow to heating device 41
125' pure oxygen to heating device 41
126 exhaust flow from heating device 41
127 exhaust flow from heat exchange in regenerator
128 exhaust flow from heat exchanger 52 to atmosphere (FIG. 1)
128' exhaust flow from heating device 41' (FIG. 2)
128" exhaust flow from heating device 41" (FIG. 3)
128''' exhaust flow from heat exchanger 54 (FIG. 3)
129 pure CO2 from regenerator
130 Pure CO2 from heat exchanger 53
201 heat exchange medium from SOFC 30 to heating device 41"
202 heat exchange medium from heating device 41" to regenerator 22
203 heat exchange medium from regenerator 22 to cooler 50
204 heat exchange medium from cooler 50 to SOFC 30

The invention claimed is:

1. A method for production of electrical energy and $H_2$ gas in a power plant comprising a Solid Oxide Fuel Cell (SOFC) (30), comprising
charging a feed gas (111) selected from the group consisting of natural gas, bio-gas and syngas,
reforming said feed gas (111) with CaO containing $CO_2$ absorber in a reformer (21) to thereby produce a carbon-free $H_2$ gas (115, 116) while converting CaO to $CaCO_3$,
regenerating the $CaCO_3$ to CaO in an endothermic reaction in a CaO regenerator (22) at a temperature of at least 850° C. utilizing heat from the SOFC (30) to heat the regenerator (22),
feeding the carbon-free $H_2$ gas to the SOFC (30), wherein at least one heat exchange medium (123, 201) collecting heat in the SOFC (30) is subjected to temperature increase in a heating device (41, 41', 41") prior to being subjected to heat exchange in the CaO regenerator (22),
the at least one heat exchange medium (123, 201) is selected from the group consisting of exhaust gas (123) from the SOFC (30) and a dedicated heat exchange medium (201) circulating in a closed loop between the SOFC (30), the heating device (41, 41', 41") and the CaO regenerator (22), and
the heating device (41, 41', 41") is charged with one of:
(i) a gas having a biogenic origin, and
(ii) a gas of fossil origin, wherein the gas is subjected to one of (a) being burned in pure oxygen to yield an exhaust gas of pure $CO_2$, and (b) being burned in air yielding an exhaust gas that is subjected to a separate step of $CO_2$ collection (128').

2. The method as claimed in claim 1, wherein the heating device (41) is a burner charged with substantially pure $H_2$ (122) as a fuel gas in an amount sufficient to increase the temperature of the exhaust gas (123) from the SOFC (30) by at least 50° C.

3. The method as claimed in claim 2, wherein at least a portion of the fuel gas charged to the heating device (41) is $H_2$ gas deviated from the reformer (21).

4. The method as claimed in claim 3, wherein at least a portion of the fuel gas (122) charged to the heating device (41) is $H_2$ gas deviated from the $H_2$ discharge (119) of the SOFC (30).

5. The method as claimed in claim 2, wherein at least a portion of the fuel gas (122) charged to the heating device (41) is $H_2$ gas deviated from the $H_2$ discharge (119) of the SOFC (30).

6. The method as claimed in claim 1, wherein the exhaust gas (123) from the SOFC (30) is hot air of about 830° C.

7. The method as claimed in claim 1, comprising operating the heating device (41) so as the exhaust gas (126) leaving the heating device (41) has a temperature of at least 850° C.

8. The method as claimed in claim 7, wherein the heating device is operated so as the exhaust gas (126) leaving the heating device (41) has a temperature of at least 1000° C.

9. The method as claimed in claim 1, wherein the heat exchange medium (201) is a dedicated heat exchange medium (201) circulating in a closed loop between the SOFC (30), the heating device (41', 41") and the CaO regenerator (22).

10. The method as claimed in claim 1, wherein fuel to both the reformer and the heating device is of biogenic origin.

11. The method as claimed in claim 1, comprising switching between a first reformer for fuel with a first amount of initial $CO_2$ and a second, larger reformer for fuel with a second, larger amount of initial $CO_2$.

12. The method as claimed in claim 1, comprising heating air with exhaust from the heating device to provide heated air, and charging the heated air to the solid oxide fuel cell.

13. The method as claimed in claim 1, wherein the heating device is charged with the gas of fossil origin, which is burned in air yielding the exhaust gas that is subjected to the separate step of $CO_2$ collection.

14. The method as claimed in claim 1, comprising heat exchanging a discharge flow from the solid oxide fuel cell with a charge flow of pure oxygen to the heating device, charging the heating device with the gas of fossil origin, and burning the gas in the pure oxygen to yield the exhaust gas of pure $CO_2$.

15. A power plant for production of electrical energy and $H_2$ gas, the power plant comprising a solid oxide fuel cell (SOFC) (30) and being arranged to receive a charge of a feed gas (111) selected from the group consisting of natural gas, bio-gas and syngas, comprising
a reformer (21) for receiving the feed gas and reforming the feed gas with a CaO containing $CO_2$ absorber to produce a carbon free $H_2$ gas (115) to be fed to the SOFC (30) and converting CaO to $CaCO_3$;
a regenerator for converting the $CaCO_3$ back to CaO at a temperature of at least 850° C., wherein
a heating device (41, 41', 41") is connected between the SOFC (30) and the regenerator (22) and configured to allow a heat exchange medium (123, 201) collecting heat from the SOFC to be additionally heated therein and thereafter used for heat exchange in the regenerator (22), and
the heat exchange medium (123, 201) is selected from the group consisting of exhaust gas (123) from the SOFC (30) and a dedicated heat exchange medium (201) circulating in a closed loop between the SOFC (30), the heating device (41, 41', 41") and the CaO regenerator (22), and
the heating device (41, 41', 41") is charged with one of:
(i) a gas having a biogenic origin, and
(ii) a gas of fossil origin, wherein the gas is subjected to one of (a) being burned in pure oxygen to yield an exhaust gas of pure $CO_2$, and (b) being burned in air to yield an exhaust gas that is thereafter subjected to a separate step of $CO_2$ collection (128').

16. The power plant as claimed in claim 15, wherein a closed loop is arranged to circulate a dedicated heat exchange medium (201) between the SOFC (30), the heating device (41, 41', 41") and the CaO regenerator (22).

17. The power plant of claim 16, wherein a discharge flow (123') from the solid oxide fuel cell (30) is heat exchanged with a charge flow of pure oxygen (125') to the heating device (41").

18. The power plant as claimed in claim 15, wherein the heating device 41 is charged with a fuel selected among fossil fuels and biofuels.

19. The power plant as claimed in claim 15, wherein oxygen required by the heating device (41') is supplied by one or more selected from the group consisting of a separate air supply (125) and a discharge flow (123') from the solid oxide fuel cell (30).

20. The power plant of claim 15, wherein a discharge flow (123') from the solid oxide fuel cell (30) is heat exchanged with a charge flow of pure oxygen (125') to the heating device (41").

* * * * *